United States Patent
Chen et al.

(10) Patent No.: US 10,116,889 B2
(45) Date of Patent: Oct. 30, 2018

(54) IMAGE SENSOR WITH TWO-DIMENSIONAL SPLIT DUAL PHOTODIODE PAIRS

(71) Applicant: OMNIVISION TECHNOLOGIES, INC., Santa Clara, CA (US)

(72) Inventors: Gang Chen, San Jose, CA (US); Qin Wang, San Jose, CA (US); Duli Mao, Sunnyvale, CA (US); Dyson H. Tai, San Jose, CA (US); Lindsay Alexander Grant, Los Gatos, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 15/443,783

(22) Filed: Feb. 27, 2017

(65) Prior Publication Data

US 2018/0249105 A1    Aug. 30, 2018

(51) Int. Cl.
*H04N 5/335* (2011.01)
*H04N 5/369* (2011.01)
*H04N 5/378* (2011.01)
*H04N 9/04* (2006.01)
*H04N 5/374* (2011.01)
*H04N 5/232* (2006.01)

(52) U.S. Cl.
CPC ....... *H04N 5/3696* (2013.01); *H04N 5/23212* (2013.01); *H04N 5/378* (2013.01); *H04N 5/3742* (2013.01); *H04N 9/045* (2013.01)

(58) Field of Classification Search
CPC ... H04N 5/3696; H04N 5/23212; H04N 5/378
USPC ....................................................... 348/294
See application file for complete search history.

(56) References Cited

U.S. PATENT DOCUMENTS

| 8,675,116 B2 | 3/2014 | Onuki |
| 2010/0091161 A1* | 4/2010 | Suzuki ............. H01L 27/14609 348/302 |

* cited by examiner

*Primary Examiner* — Usman Khan
(74) *Attorney, Agent, or Firm* — Christensen O'Connor Johnson Kindness PLLC

(57) ABSTRACT

An image sensor includes an array of split dual photodiode (DPD) pairs. First groupings of the array of split DPD pairs consist entirely of either first-dimension split DPD pairs or entirely of second-dimension split DPD pairs. Each first grouping of the array of split DPD pairs consisting of the first-dimension split DPD pairs is adjacent to an other first grouping of the array of split DPD pairs consisting of the second-dimension split DPD pairs. The first-dimension is orthogonal to the second-dimension. A plurality of floating diffusion (FD) regions is arranged in each first grouping of the split DPD pairs. Each one of a plurality of transfer transistors is coupled to a respective photodiode of a respective split DPD pair, and is coupled between the respective photodiode and a respective one of the plurality of FD regions.

24 Claims, 4 Drawing Sheets

FIG. 2

IMAGE SENSOR WITH TWO-DIMENSIONAL SPLIT DUAL PHOTODIODE PAIRS

BACKGROUND INFORMATION

Field of the Disclosure

This invention is related to image sensors. In particular, embodiments of the present invention are related to pixel arrays for image sensing as well as phase sensing.

Background

Image sensors have become ubiquitous. They are widely used in digital cameras, cellular phones, security cameras, as well as, medical, automotive and other applications. The technology used to manufacture image sensors, and in particular, complementary metal-oxide-semiconductor (CMOS) image sensors, has continued to advance at great pace. When acquiring images, incident light from an image is focused onto the image sensor. Conventional methods to adjust the focus of the image light may include manual adjustment by the user, or automatic focusing using contrast detection or phase detection techniques. With contrast detection autofocus techniques, the image sensor adjusts the focus until the contrast of high-contrast features in the image are maximized. However, this contrast detection technique is not ideal in some situations because the image sensor must continually adjust the focus to verify that the contrast is maximized. On the other hand, with phase detection autofocus techniques, the incident light is typically split through two exit pupils along a left-right direction, which are dedicated for phase detection only. The split beams are then compared to determine focus information. However, the other areas on the image sensor are used for image sensing only and are therefore not used for focusing. Furthermore, such arrangements are not as effective for determining focus of an image in an up-down direction.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2 is a diagram illustrating a simplified layout view of an example pixel array with adjacent rows of horizontally split dual photodiode pairs and adjacent rows of vertically split dual photodiode pairs with transfer transistors and shared floating diffusions in accordance with the teachings of the present invention.

Figure 1:
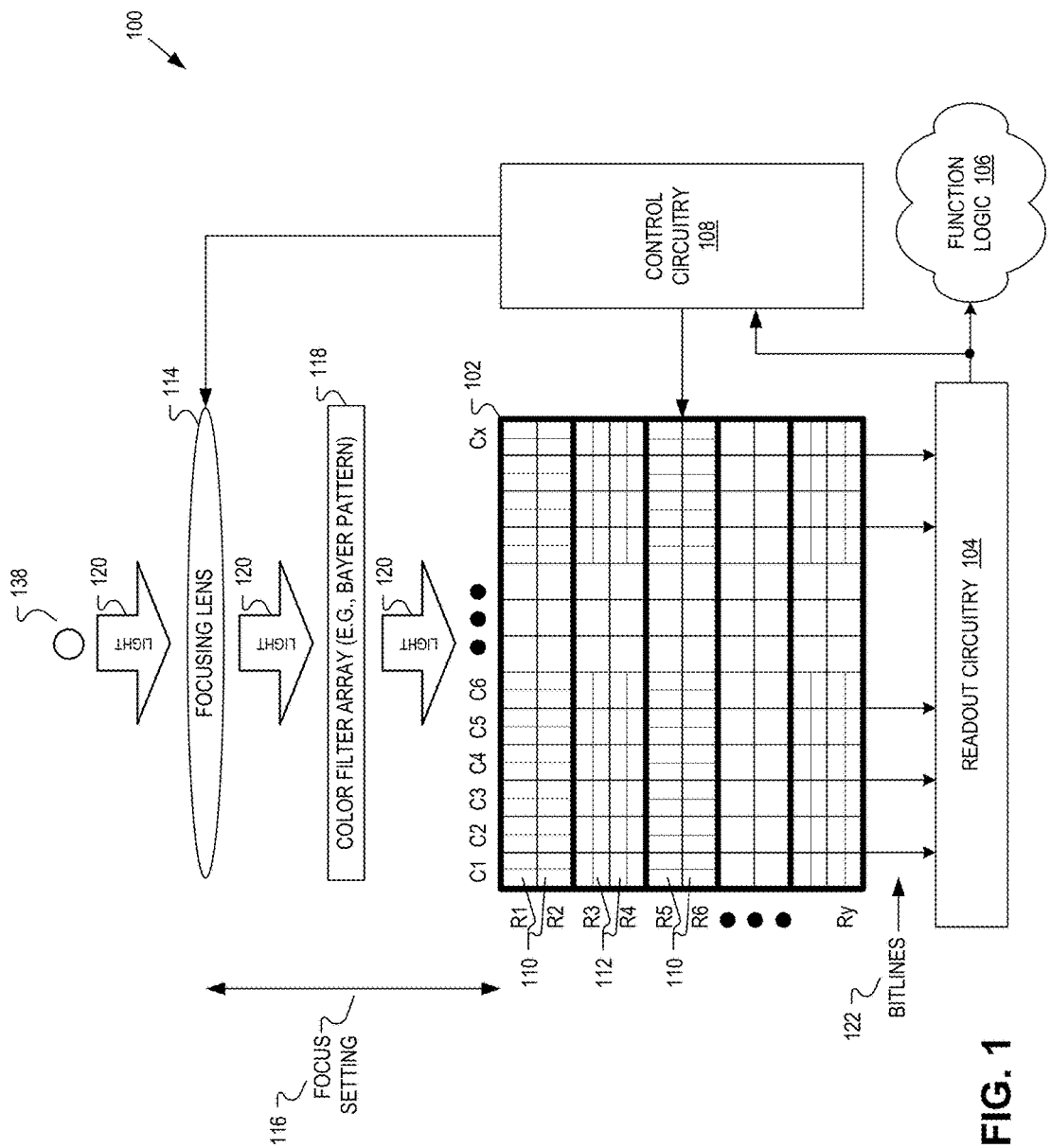
FIG. 1 is a block diagram illustrating an imaging system including a pixel array with adjacent rows of horizontally split dual photodiode pairs and adjacent rows of vertically split dual photodiode pairs in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an image sensor including a pixel array with adjacent rows of horizontally split dual photodiode pairs and adjacent rows of vertically split dual photodiode pairs to provide both image sensing and phase sensing are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of two-dimensional pixel arrays with adjacent rows of horizontally split dual photodiode pairs as well as adjacent rows of vertically split dual photodiode pairs are disclosed to provide both image sensing and phase sensing with all photodiodes. In one example, all of the photodiodes in the pixel array are utilized to provide imaging information for the pixel array. In addition, all of the photodiodes in the pixel array are also utilized to provide phase information. The phase information may be used to provide autofocusing capability. In the example, the horizontally split dual photodiode pairs may be used effectively to detect and focus on horizontal features in an image, and the vertically split dual photodiode pairs may be used effectively to detect and focus on the vertical features in the image. In the example, neighboring pairs of the split dual photodiode pairs may share the same floating diffusion.

To illustrate, FIG. 1 is a block diagram illustrating an imaging system 100 including a pixel array of split dual photodiode (DPD) pairs in accordance with the teachings of the present invention. In particular, as shown in the depicted example, the imaging system 100 includes a pixel array 102, readout circuitry 104, function logic 106, control circuitry 108, and focusing lens 114 in accordance with the teachings of the present invention. In an example in which imaging system 100 is a color imaging system, a color filter array 118 may also be included as shown.

As shown in the example illustrated in FIG. 1, pixel array 102 is a two-dimensional (2D) pixel array arranged into a plurality of first groupings and a plurality of second groupings. For instance, in the examples described in this disclosure, the plurality of first groupings may be a plurality of rows, and the plurality of second groupings may be a plurality of columns, or vice versa. In one example, each first grouping may include a single row. In another example, each first grouping may include at least an adjacent pair of rows, or an adjacent plurality of rows.

To illustrate, FIG. 1 shows specifically an example in which pixel array 102 is arranged into a plurality of rows R1 to Ry, and a plurality of columns C1 to Cx. In the example, adjacent pairs of rows of pixel array 102 consist entirely of either first-dimension split DPD pairs 110, or entirely of second-dimension split DPD pairs 112. For instance, the adjacent pair of rows R1 and R2 consist entirely of first-dimension split DPD pairs 110. The pair of rows R3 and R4 (which is adjacent to the pair of rows R1 and R2) consist entirely of second-dimension split DPD pairs 112. Similarly, the pair of rows R5 and R6 (which is adjacent to the pair of rows R3 and R4) consist entirely of first-dimension split DPD pairs 110, and so on. In the various examples, the first-dimension is orthogonal to the second-dimension. For instance, in the examples described in the present disclosure, the first-dimension may refer to a horizontal dimension and the second-dimension may refer to a vertical dimension. Accordingly, first-dimension split DPD pairs 110 may refer to horizontally-split DPD pairs, and second-dimension split DPD pairs 112 may refer to vertically-split DPD pairs in accordance with the teachings of the present invention. It is noted that for purposes of this disclosure, the horizontally-split DPD pairs 110 are illustrated with a horizontal line separating the photodiodes, and that the vertically-split DPD pairs 112 are illustrated with a vertical line separating the photodiodes.

It should be appreciated that the specific example described in FIG. 1 illustrates that the horizontally-split DPD pairs and the vertically-split DPD pairs are organized by rows for explanation purposes. However, it is noted that the in in other examples, the horizontally-split DPD pairs and the vertically-split DPD pairs may also be arranged by columns, or staggered, etc., in accordance with the teachings of the present invention.

In the depicted example, all of the photodiodes included in pixel array 102 may be used to provide to acquire image data from incident light 120 from an object 138 such as person, place, thing, etc., which can then be used to render a 2D image of the person, place, thing, etc., in accordance with the teachings of the present invention. In addition, the horizontally split DPD pairs 110 (e.g., in row pairs R1/R2, R5/R6, . . . etc.) may also be used to provide phase information for horizontal features of the acquired image, and the vertically split DPD pairs 112 (e.g., in row pairs R3/R4, etc.) may also be used to provide phase information for vertical features of the acquired image in accordance with the teachings of the present invention. The phase information detected from the split DPD pairs may be used to adjust the focus setting 116 of lens 114 to focus the incident light 120 onto pixel array 102 in accordance with the teachings of the present invention.

The image data and phase data are read out by readout circuitry 104 through bitlines 122, and are then transferred to function logic 106 and/or control circuitry 108. In various examples, readout circuitry 104 may include amplification circuitry, analog-to-digital (ADC) conversion circuitry, or the like. Function logic 106 may include digital circuitry and may simply store the image data or even manipulate the image data with image signal processing techniques to apply post image effects (e.g., crop, rotate, remove red eye, adjust brightness, adjust contrast, or otherwise). In one example, readout circuitry 104 may read out a row of image data at a time along bitlines 122 (illustrated) or may read out the image data using a variety of other techniques (not illustrated), such as for example a serial readout or a full parallel read out of all pixels simultaneously.

As shown, control circuitry 108 is coupled to pixel array 102 to control the operational characteristics of pixel array 102. For example, control circuitry 108 may generate control signals, such as the transfer gate control signals mentioned above, as well as for example, reset signals, select signals, shutter signals, and other control signals coupled to pixel array 102 to control image acquisition. In one example, the shutter signal is a global shutter signal for simultaneously enabling all pixel cells within pixel array 102 to simultaneously capture their respective image data during a single acquisition window. In another example, the shutter signal is a rolling shutter signal such that each row, column, or group of pixels is sequentially enabled during consecutive acquisition windows.

In addition, the example depicted in FIG. 1 also shows that control circuitry 108 is coupled to control focusing lens 114. In one example, control circuitry 108 may adjust the focus setting 116 of focusing lens 114 to focus the image included in incident light 120 from the object 138 using the phase information detected by the split DPD pairs 110 and 112 of pixel array 102 in accordance with the teachings of the present invention. In an example in which imaging system 100 is a color imaging system, a color filter array 118 may also be included and is optically coupled between focusing lens 114 and pixel array 102 as shown. In the example, the incident light from the object 138 is focused through focusing lens 120 and through color filter array 118 onto pixel array 102 to acquire the image. In one example, the color filter array 118 includes a mosaic of color filters that are arranged in a pattern, such as for example a Bayer pattern, to filter the color information of incident light 120 from the object 138 onto pixel array 102 in accordance with the teachings of the present invention.

Figure 2:
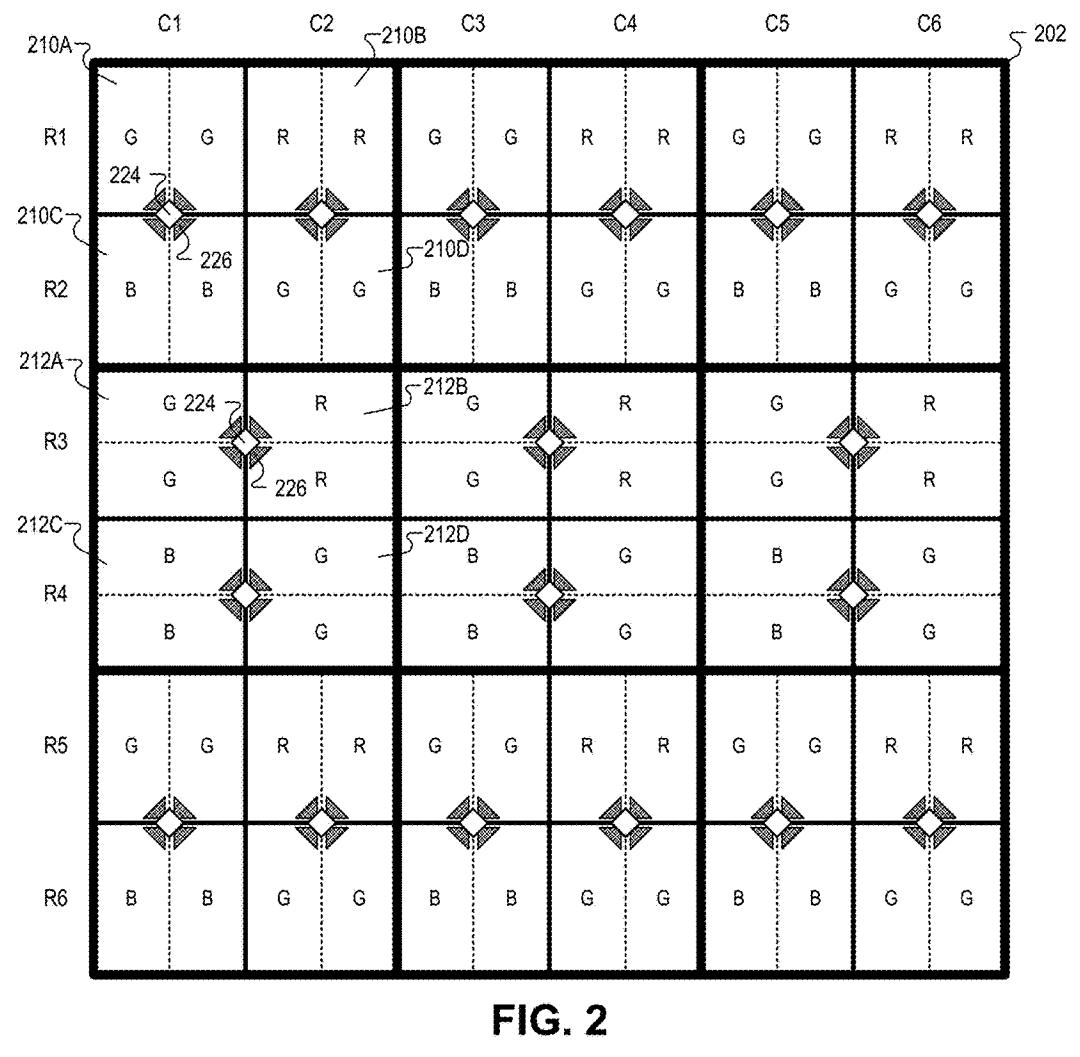

FIG. 2 is a diagram illustrating a simplified layout view of a portion of one example of a pixel array 202 including adjacent rows of horizontally split DPD pairs and adjacent rows of vertically split DPD pairs with transfer transistors and shared floating diffusions in accordance with the teachings of the present invention. It is noted that pixel array 202 of FIG. 2 may be an example of pixel array 102 shown in FIG. 1, and therefore it should be appreciated that similarly named and numbered elements referenced below are coupled and function as described above.

In the depicted example, pixel array 202 includes a plurality of rows R1 to R6, and a plurality of columns C1 to C6 of split DPD pairs. As shown in the depicted example, the first and third adjacent pairs of rows R1/R2 and R5/R6 include horizontally split DPD pairs, and the second pair of rows R3/4 include vertically split DPD pairs. Thus, it is appreciated that each adjacent pair of rows of horizontally split DPD pairs (e.g., R1/R2, R5/R6, etc.) is adjacent to an adjacent pair of rows of vertically split DPD pairs (e.g., R3/R4, etc.), and that each adjacent pair of rows of vertically split DPD pairs is therefore adjacent to an adjacent pair of rows of horizontally split DPD pairs.

The particular example depicted in FIG. 2 also illustrates an example in which pixel array 202 is implemented with a color filter array, arranged in for example a Bayer pattern. As such pixel array 202 includes a corresponding 4×4 grouping of split DPD pairs as shown. For instance, in the adjacent rows R1 and R2, horizontally split DPD pair 210A and horizontally split DPD pair 210D correspond to a green (G) color filters, horizontally split DPD pair 210B corresponds to a red (R) color filter, and horizontally split DPD pair 210C corresponds to a blue (B) color filter. Similarly, in the adjacent rows R3 and R4, vertically split DPD pair 212A and vertically split DPD pair 212D correspond to a green (G) color filters, vertically split DPD pair 212B corresponds to a red (R) color filter, and vertically split DPD pair 212C corresponds to a blue (B) color filter. As shown in the depicted example, it is noted that for purposes of this disclosure, the horizontally-split DPD pairs 210 are illustrated with a horizontal dashed line separating the photodiodes, and that the vertically-split DPD pairs 212 are illustrated with a vertical dashed line separating the photodiodes.

The example shown in FIG. 2 shows that pixel array 202 also includes a plurality of floating diffusion (FD) regions 224 arranged in each of the adjacent pair of rows (R1/R2, R3/R4, R5/R6, etc. In the example, each one of the FD regions 224 is surrounded by two neighboring split DPD pairs, and is disposed in a center corner region of the two neighboring split DPD pairs. As such, each one of the FD regions 224 is coupled to and shared among the two neighboring split DPD pairs.

To illustrate, in the adjacent pair of rows R1/R2, there is a floating diffusion 224 surrounded by horizontally split DPD pair 210A and horizontally split DPD pair 210C as shown. As will be described in greater detail below, each split DPD pair includes a pair of photodiodes. All of the photodiodes in pixel array 202 are coupled to provide both image information and phase information from incident light in accordance with the teachings of the present invention. The photodiodes of split DPD pairs 210A and 210C are split and arranged horizontally in split DPD pairs 210A and 210C on opposite sides of the dashed lines shown in FIG. 2. As such, the floating diffusion 224 is disposed in a center corner region of the two neighboring split DPD pairs 210A and 210C between the four photodiodes.

Similarly, in the adjacent pair of rows R3/R4, there is a floating diffusion 224 surrounded by vertically split DPD pair 212A and vertically split DPD pair 212B as shown. The photodiodes of split DPD pairs 212A and 212B are split and arranged vertically in split DPD pairs 212A and 212B on opposite sides of the dashed lines shown in FIG. 2. As such, the floating diffusion 224 is disposed in the center corner region of the two neighboring split DPD pairs 212A and 212B between the four photodiodes.

As shown in the example, pixel array 202 also includes a plurality of transfer transistors 226. As will be described in greater detail below, each one of the transfer transistors 226 is coupled to a respective photodiode of the respective split DPD pair, and is coupled between the respective photodiode and a respective one of the FD regions 224 that is shared by the respective split DPD pair. As such, each one of the transfer transistors 226 is disposed proximate to the center corner region of the two neighboring split DPD pairs such that the respective FD region 224 is surrounded by the respective transfer transistors 226 of the two neighboring split DPD pairs.

To illustrate, in the adjacent pair of rows R1/R2, there are transfer transistors 226 disposed in the center corner region of the two neighboring split DPD pairs 210A and 210C between the four photodiodes of split DPD pairs 210A and 210C, and therefore surround floating diffusion 224 as shown. Similarly, in the adjacent pair of rows R3/R4, there are transfer transistors 226 disposed in the center corner region of the two neighboring split DPD pairs 212A and 212B between the four photodiodes of split DPD pairs 212A and 212B, and therefore surround floating diffusion 224 as shown.

It should be appreciated that the particular example described in FIG. 2 illustrates that each FD region 224 is coupled to and shared by 4 photodiodes or two split DPD pairs for explanation purposes. However, it is appreciated that the in other examples, each FD region 224 may be coupled to a different number of photodiodes, such as 2 photodiodes, multiple photodiodes, etc., in accordance with the teachings of the present invention.

Figure 3:
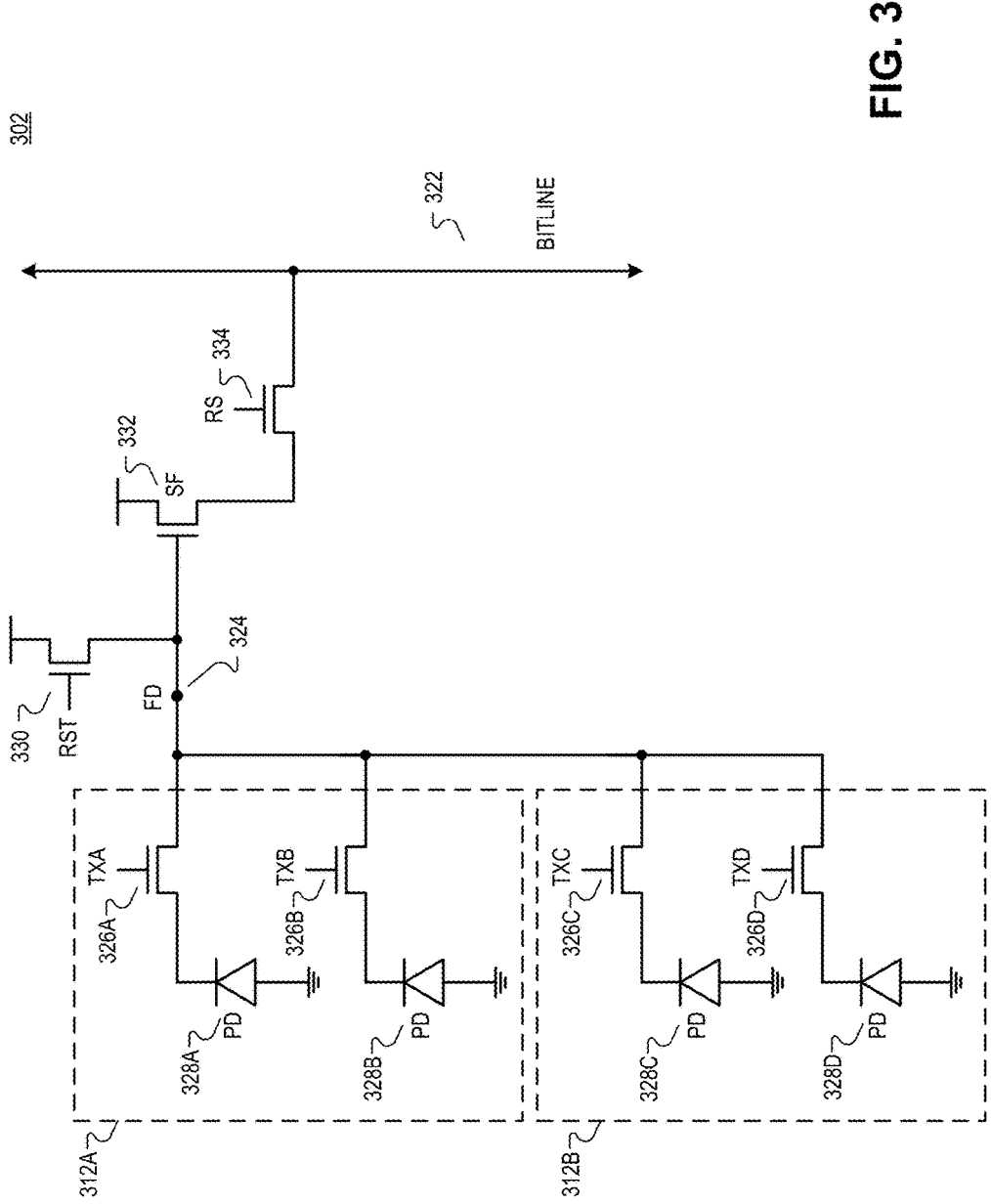
FIG. 3 shows one example schematic of two neighboring split dual photodiode pairs that share a floating diffusion in the example pixel circuitry of a pixel array in accordance with the teachings of the present invention.

FIG. 3 shows one example schematic of two neighboring split DPD pairs 312A and 312B that share a floating diffusion in example pixel circuitry of a pixel array in accordance with the teachings of the present invention. It is noted that the two neighboring split DPD pairs 312A and 312B of FIG. 3 may be an examples of the two neighboring split DPD pairs 212A and 212B, or 210A and 210C shown in FIG. 2. In addition, it is noted that the shared floating diffusion FD 324 of FIG. 3 may be an example of the shared floating diffusions 224 of FIG. 2, and therefore it should be appreciated that similarly named and numbered elements referenced below are coupled and function as described above.

As shown in the example schematic depicted in FIG. 3, split DPD pair 312A includes a split pair of photodiodes PD 328A and PD 328B, which are coupled to photogenerate image charge in response to incident light (e.g., incident light 120 from object 138). Similarly, neighboring split DPD pair 312B, which is disposed proximate to split DPD pair 312A in the pixel array, includes a split pair of photodiodes PD 328C and PD 328D, which are also coupled to photogenerate image charge in response to incident light (e.g., incident light 120 from object 138). The example neighboring split DPD pairs 212A and 212B of FIG. 2 may illustrate an example in which split pair of photodiodes PD 328A and PD 328B and split pair of photodiodes PD 328C and PD 328D of FIG. 3 are vertically split photodiodes. Similarly, the example neighboring split DPD pairs 210A and 210C of FIG. 2 may also illustrate an example in which split pair of photodiodes PD 328A and PD 328B and split pair of photodiodes PD 328C and PD 328D of FIG. 3 are horizontally split photodiodes.

In the depicted example, split DPD pair 312A also includes transfer transistor 326A coupled to photodiode PD 328A, and transfer transistor 326B coupled to photodiode PD 328B. Similarly, split DPD pair 312B includes transfer transistor 326C coupled to photodiode PD 328C, and transfer transistor 326D coupled to photodiode PD 328D. As shown, each one of the transfer transistors 326A, 326B, 326C, and 326D is coupled to a respective photodiode PD 328A, 328B, 328C, or 328D, of a respective split DPD pair 312A or 312B. Each one of the transfer transistors 326A, 326B, 326C, and 326D is therefore coupled between the respective photodiode PD 326A, PD 326B, PD 326C, or PD 326D and a floating diffusion FD 324 region, which is shared by the two neighboring split DPD pairs 312A and 312B in accordance with the teachings of the present invention. Referring also back to FIG. 2, each one of the transfer transistors 326A, 326B, 326C, and 326D in FIG. 3 is disposed proximate to a center corner region of the two neighboring split DPD pairs 312A and 312B, such that floating diffusion FD 324 region is surrounded by the transfer transistors 326A, 326B, 326C, and 326D (see also FIG. 2, which illustrates transfer transistors 226 surrounding floating diffusion regions 224 in center corner regions of neighboring split DPD pairs).

In operation, the shared floating diffusion FD 324 region is coupled to convert the image charge that photogenerated in each one of the photodiodes PD 328A, PD 328B, PD 328C, or PD 328D into voltages. The transfer transistors 326A, 326B, 326C, and 326D are coupled to independently control a transfer of the image charge from the photodiodes PD 328A, PD 328B, PD 328C, or PD 328D to the shared floating diffusion FD 324 region in response to transfer control signals TXA, TXB, TXC, or TXD, respectively. During operation, each one of the respective transfer control signals TXA, TXB, TXC, or TXD may be set by the control circuitry, such as for example control circuitry 108 of FIG. 1

The example shown in FIG. 3 also illustrates a reset transistor 330 that is coupled to the shared floating diffusion region FD 324. In the example, the reset transistor 330, in response to a reset control signal RST, is coupled to reset the shared floating diffusion region FD 324 and each of the shared photo diodes which are coupled to this floating diffusion node to a reset voltage during a reset period. In addition, an amplifier transistor SF 332 having an input terminal coupled to the shared floating diffusion region FD 324 is coupled to generate an amplified signal at an output terminal of the amplifier transistor SF 334. In the example, the amplified signal may include both image information and phase information sensed by the respective photodiode PD 328A, PD 328B, PD 328C, or PD 328D in response to incident light. In the example depicted in FIG. 3, amplifier transistor SF 334 is a source-follower such that the source terminal of the amplifier transistor SF 332 is the output terminal, the gate terminal of the amplifier transistor SF 332 is the input terminal, and the drain terminal of the amplifier transistor SF 332 is coupled to a supply voltage. In addition, an optional select transistor 334 is coupled between the output terminal of the amplifier transistor SF 332 and an output bitline 322. In operation, the select transistor 334 is coupled to output the amplified output of amplifier transistor SF 332 to output bitline 322 in response to a row select control signal RS. In one example, the output bitline 322 is coupled to readout circuitry, such as for example readout circuitry 104 shown in FIG. 1.

Figure 4:
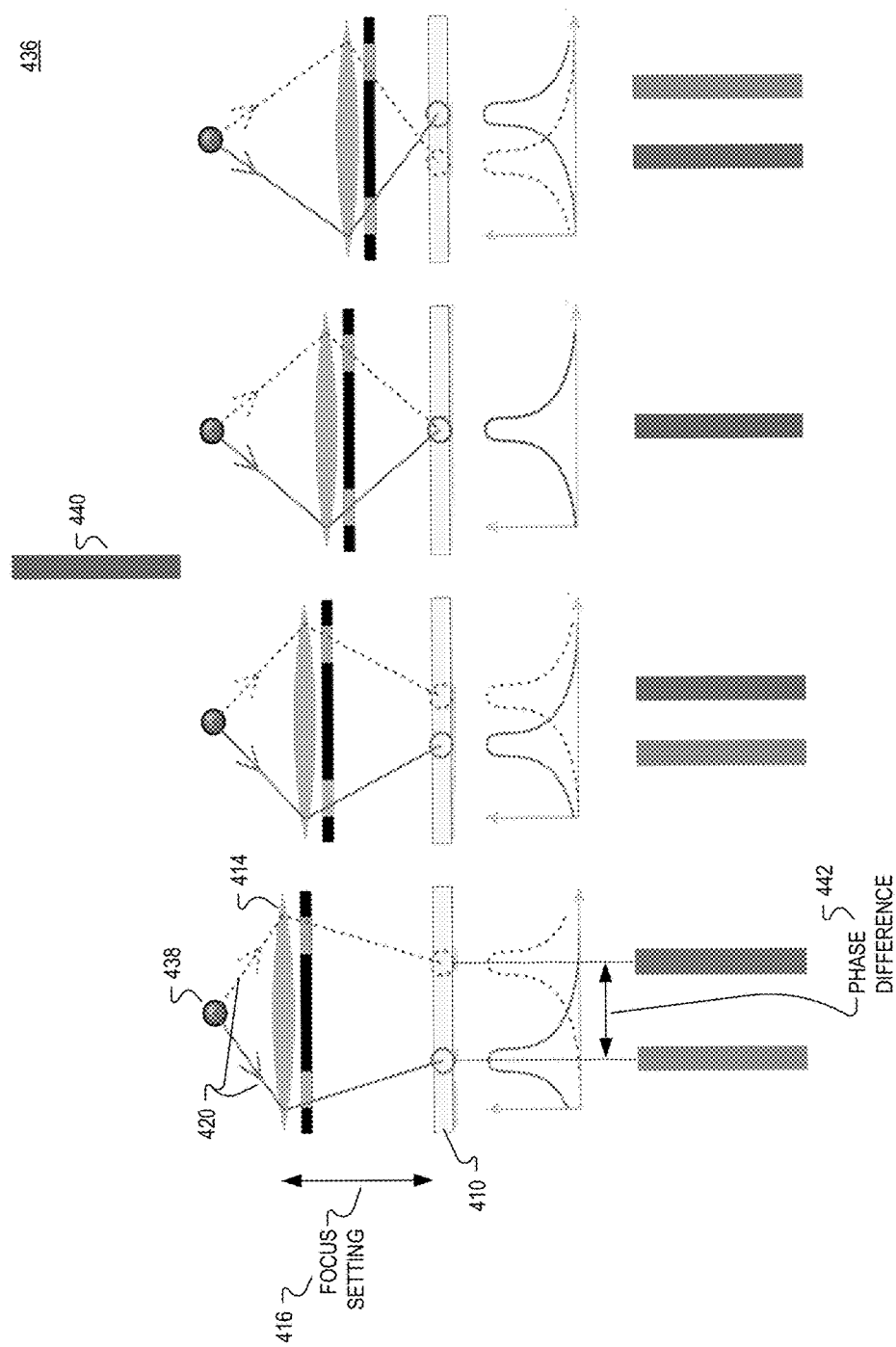
FIG. 4 shows an example diagram illustrating a comparison of the phase difference profiles of an object that is in and out of focus using the phase information sensed by the photodiodes of a pixel array in an imaging system in accordance with the teachings of the present invention.

FIG. 4 shows an example diagram 436 illustrating a comparison of the phase difference profiles of an object that is in and out of focus using the phase information sensed by the photodiodes of a pixel array in an imaging system accordance with the teachings of the present invention. It is appreciated that the imaging system described in FIG. 4 may be an example of the imaging system and associated elements described above in FIGS. 1-3, and it should therefore be appreciated that similarly named and numbered elements referenced below are coupled and function as described above.

In the example diagram 436 depicted in FIG. 4, incident light 420 from an object 438 focused through a focusing lens 414 onto a split DPD pair 410 of the image sensor pixel array. The light rays of incident light 420 that are illustrated in FIG. 4 pass through openings on opposite sides of focusing lens 414. In the example illustrated in FIG. 4, element 440 represents a vertical feature of object 438, and the example split DPD pair 410 shown in FIG. 4 therefore represents a vertically split DPD pair, such as for example vertically split DPD pairs 212A, 212B, 212C, or 212D of FIG. 2. In another example in which element 440 represents a horizontal feature of object 438, and the example split DPD pair 410 shown in FIG. 4 may therefore represent a horizontally split DPD pair, such as for example horizontally split DPD pairs 210A, 210B, 210C, or 210D of FIG. 2.

It is also noted that for explanation purposes, and in order to avoid obscuring the teachings of the present invention, FIG. 4 is a simplified diagram, and therefore shows that the light rays of incident light 420 passing through the openings on opposite sides of focusing lens 414 are incident on only one split DPD pair 410. However, it is appreciated that the split DPD pair 410 shown in FIG. 4 is to represent a split DPD pair 410 for each opening in focusing lens 414.

The associated diagrams illustrated below each split DPD pair 410 show the respective intensity profiles and phase difference 442 profiles sensed by split DPD pair 410 for various different focus settings 416 of focusing lens 414. As such, the first diagram on the left side of FIG. 4 illustrates an example in which the focus setting 416 for focusing lens 414 is set to be too far, which results is the non-zero phase difference 442 as shown. The second diagram from the left side illustrates an example in which the focus setting 416 for focusing lens 414 is a little better, but still too far as the phase difference 442 is reduced, but is still greater than zero as shown. The third diagram from the left side illustrates an example in which the focus setting 416 for focusing lens 414 is correct, as there is no phase difference. Finally, the diagram on the right side of FIG. 4 illustrates an example in which the focus setting 416 for focusing lens 414 is set to be over corrected, as the phase difference is non-zero as shown.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor, comprising:
an array of split dual photodiode (DPD) pairs arranged into a plurality of first groupings and a plurality of second groupings, wherein each first grouping of the array of split DPD pairs consists entirely of either first-dimension split DPD pairs or entirely of second-dimension split DPD pairs, wherein each first grouping of the array of split DPD pairs consisting of the first-dimension split DPD pairs is adjacent to an other first grouping of the array of split DPD pairs consisting of the second-dimension split DPD pairs, wherein the first-dimension is orthogonal to the second-dimension, wherein each one of the split DPD pairs is coupled to sense both phase information and image information from incident light;
a plurality of floating diffusion (FD) regions arranged in each first grouping of the split DPD pairs; and a plurality of transfer transistors, wherein each one of the plurality of transfer transistors is coupled to a respective photodiode of a respective split DPD pair, and is coupled between the respective photodiode and a respective one of the plurality of FD regions.

2. The image sensor of claim 1, wherein the plurality of first groupings is a plurality of rows, and wherein the plurality of second groupings is a plurality of columns.

3. The image sensor of claim 2, wherein each first grouping comprises a plurality of adjacent rows.

4. The image sensor of claim 3, wherein each one of plurality of FD regions is surrounded by two neighboring split DPD pairs and is disposed in a center corner region of the two neighboring split DPD pairs, wherein said each one of the plurality of FD regions is coupled to and shared among the two neighboring split DPD pairs, and
wherein said each one of the plurality of transfer transistors is disposed proximate to the center corner region such that said respective one of the plurality of FD regions is surrounded by and coupled to the respective transfer transistors of the two neighboring split DPD pairs.

5. The image sensor of claim 1, wherein each first grouping of the array of split DPD pairs consisting of the second-dimension split DPD pairs is adjacent to an other first grouping of the array of split DPD pairs consisting of the first-dimension split DPD pairs.

6. The image sensor of claim 1, wherein the first-dimension is one of a horizontal dimension or a vertical dimension, and wherein the second-dimension is an other one of the horizontal dimension or the vertical dimension.

7. The image sensor of claim 1, wherein the incident light is directed through a focusing lens, wherein a focus setting of the focusing lens is coupled to be adjusted in response to the phase information sensed by the split DPD pairs.

8. The image sensor of claim 1, wherein each one of the plurality of FD regions is further coupled to a reset transistor coupled to reset the respective FD region in response to a reset signal.

9. The image sensor of claim 1, wherein each one of the plurality of FD regions is further coupled to an amplifier circuit coupled to generate an output signal in response to charge transferred to the respective FD region.

10. The image sensor of claim 9, wherein each one of the amplifier circuits is coupled to a bitline output of the image sensor through a select transistor in response to a select signal.

11. The image sensor of claim 1, further comprising a color filter array including a mosaic of color filters arranged above the array of split DPD pairs.

12. The image sensor of claim 11, wherein the color filter array is arranged in a Bayer pattern.

13. An imaging system, comprising:
a pixel array including:
an array of split dual photodiode (DPD) pairs arranged into a plurality of first groupings and a plurality of second groupings, wherein each first grouping of the array of split DPD pairs consists entirely of either first-dimension split DPD pairs or entirely of second-dimension split DPD pairs, wherein each first grouping of the array of split DPD pairs consisting of the first-dimension split DPD pairs is adjacent to an other first grouping of the array of split DPD pairs consisting of the second-dimension split DPD pairs, wherein the first-dimension is orthogonal to the second-dimension, wherein each one of the split DPD pairs is coupled to sense both phase information and image information from the light directed onto the pixel array through the focusing lens;
a plurality of floating diffusion (FD) regions arranged in said each first grouping of the split DPD pairs; and
a plurality of transfer transistors, wherein each one of the plurality of transfer transistors is coupled to a respective photodiode of a respective split DPD pair, and is coupled between the respective photodiode and a respective one of the plurality of FD regions; and
a focusing lens optically coupled to focus light onto the pixel array, wherein a focus setting of the focusing lens is coupled to be adjusted in response to phase information sensed by the split DPD pairs.

14. The imaging system of claim 13, wherein the plurality of first groupings is a plurality of rows, and wherein the plurality of second groupings is a plurality of columns.

15. The imaging system of claim 14, wherein each first grouping comprises a plurality of adjacent rows.

16. The imaging system of claim 15, wherein each one of plurality of FD regions is surrounded by two neighboring split DPD pairs and is disposed in a center corner region of the two neighboring split DPD pairs, wherein said each one of the plurality of FD regions is coupled to and shared among the two neighboring split DPD pairs, and
wherein said each one of the plurality of transfer transistors is disposed proximate to the center corner region such that said respective one of the plurality of FD regions is surrounded by the respective transfer transistors of the two neighboring split DPD pairs.

17. The imaging system of claim 13, further comprising:
control circuitry coupled to the pixel array and to the focusing lens to control operation of the pixel array and the focusing lens;
readout circuitry coupled to the pixel array to readout image information and phase information from the pixel array; and
function circuitry coupled to the readout circuitry to store the image data and phase information readout from the pixel array.

18. The imaging system of claim 13, wherein each first grouping of the array of split DPD pairs consisting of the second-dimension split DPD pairs is adjacent to an other first grouping of the array of split DPD pairs consisting of the first-dimension split DPD pairs.

19. The imaging system of claim 13, wherein the first-dimension is one of a horizontal dimension or a vertical dimension, and wherein the second-dimension is an other one of the horizontal dimension or the vertical dimension.

20. The imaging system of claim 13, wherein each one of the plurality of FD regions is further coupled to a reset transistor coupled to reset the respective FD region in response to a reset signal.

21. The imaging system of claim 13, wherein each one of the plurality of FD regions is further coupled to an amplifier circuit coupled to generate an output signal in response to charge transferred to the respective FD region.

22. The imaging system of claim 21, wherein each one of the amplifier circuits is coupled to a bitline output of the pixel array through a select transistor in response to a select signal.

23. The imaging system of claim 13, further comprising a color filter array including a mosaic of color filters, wherein the focusing lens is optically coupled to focus the light onto the pixel array through the color filter array.

24. The imaging system of claim 14, wherein the color filter array is arranged in a Bayer pattern.

* * * * *